Patented Dec. 22, 1942

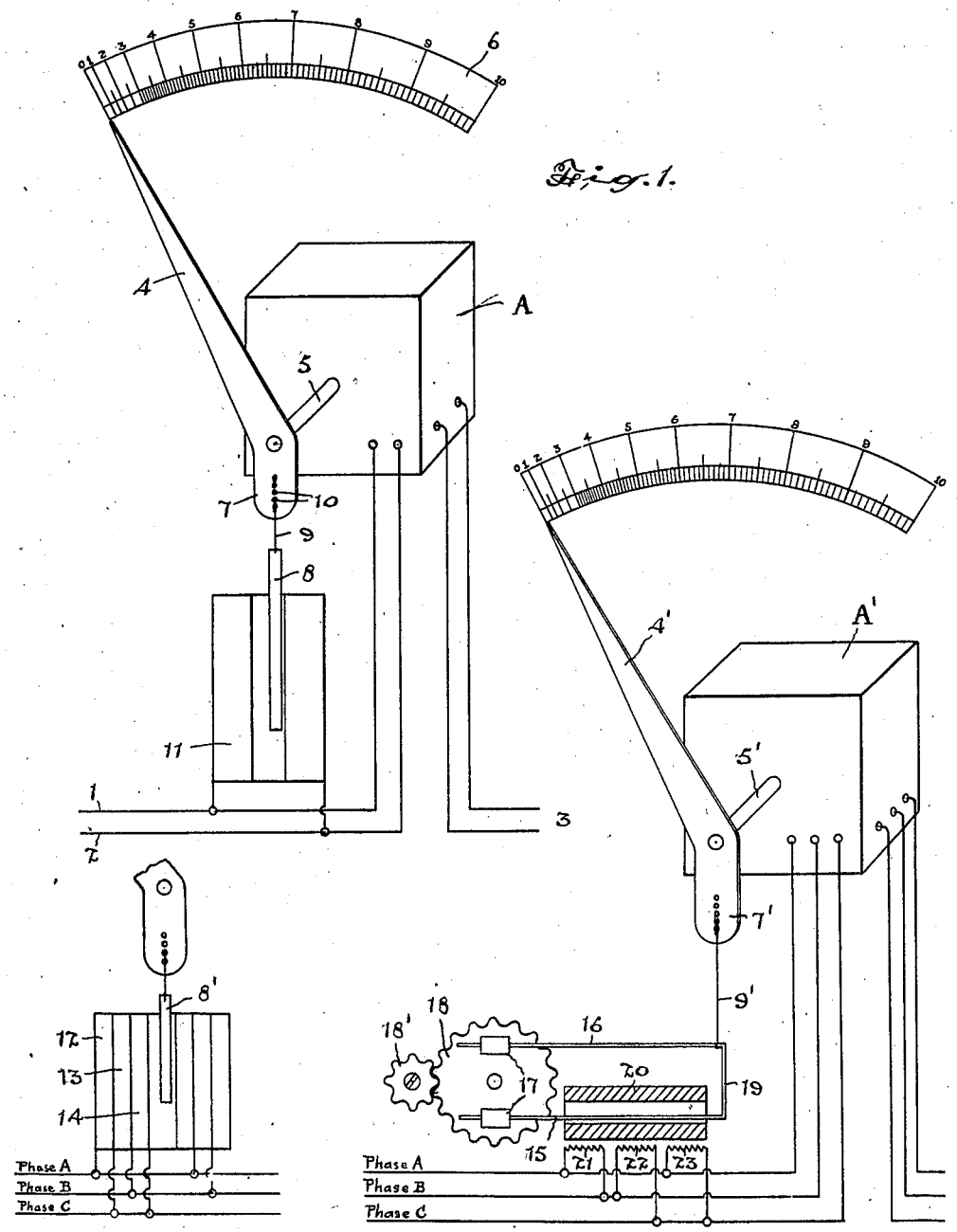

2,306,129

UNITED STATES PATENT OFFICE 2,306,129

VOLT-AMPERE METER

Paul M. Lincoln and Louis A. Paine, Ithaca, N. Y., assignors to Therm-Electric Meters Co. Incorporated, Ithaca, N. Y.

Application March 1, 1940, Serial No. 321,624

7 Claims. (Cl. 171—34)

This invention relates to thermal volt-ampere meters which as at present constructed give an accurate reading only when a normal fixed voltage is available and it is an important object of the present invention to compensate for inaccuracies in the reading of meters of this type due to variations in line voltage so that an accurate indication will be given irrespective of voltage fluctuation above or below normal.

The principal feature of the invention resides in the novel application to the meter indicator or associated parts of a restraining means which exerts a retarding influence thereon in proportion to variations in the voltage of the system with which the meter is connected so that the meter indication will always be proportional to the true volt-amperes or kilovolt-amperes independent of voltage fluctuations.

In the drawing—

Figure 1 is a diagrammatic view illustrating one manner of carrying the present invention into effect in connection with a volt-ampere meter of the instantaneous response type.

Figure 2 is a diagrammatic view illustrating a modified form of application of the present invention to a volt-ampere meter of the demand type.

Figure 3 is a diagrammatic view of a modified form of application of the present invention to a polyphase circuit suitable in connection with the type of meter shown in Figure 1.

In volt-ampere meters as at present constructed it is found that inaccurate indications are given due to unavoidable fluctuations in the line voltage with the result that the meter will indicate a low value when the voltage is higher than normal and a high value when the voltage is lower than normal, and the present invention has been devised to overcome this difficulty.

Referring to the form of invention shown in Figure 1 the unit A represents any conventional form of volt-ampere or kilovolt-amperes having an indicating pointer 4, or the equivalent, mounted on the meter-actuated shaft 5 and co-operating with a scale 6, usually a scale of squares.

The meter A is connected with the line wires 1 and 2 leading to the load 3 which are intended to carry a normal predetermined constant voltage which is subject at times to variations above or below this normal voltage as normally occur in practice.

The pointer 4 is here shown provided with an angular extension 7 projecting vertically below the meter shaft 5 when the pointer is at the zero position.

A solenoid core 8 is flexibly suspended from the angular extension 7 by a suitable form of connection 9, here shown pivotally engaging in one of a series of apertures 10 arranged in vertical radial relation to the axis of shaft 5.

A solenoid coil 11 of the desired capacity to suit the normal voltage loosely encircles the flexibly suspended core 8 and is connected across the line wires 1 and 2 so that there will be a constant downward pull on the core 8 in proportion to the prevailing voltage or potential in the supply line with which the meter A is connected, and since the pull of the core 8 with the indicator 4 at the zero position is in a line passing through the axis of the shaft 5, there will be no interference with the required zero positioning of the pointer.

However, as the pointer 4 departs from the zero indication in response to a load passing through the meter unit A, there will be a compensating influence on the movement of the pointer directly proportional to fluctuations in the line voltage due to the variable pull exerted by the core 8 on the extension 7 of the pointer 4, that is to say, while the line voltage is normal the pull on the solenoid core 8 is not sufficient to balance out the normal line voltage and causes no deviation from true volt-ampere indication. At voltages higher than normal the solenoid pull opposes the torque on the meter shaft caused by the meter mechanism and causes a smaller reading and at voltages lower than normal the pull of the solenoid is additive to the meter torque and causes a higher reading.

It will be readily appreciated that the point of connection of the core 8 with the pointer extension 7 may be accurately selected to obtain the desired counteracting influence and further adjustments may be made if necessary by varying the relationship between the coil 11 and core 8 such as by vertical shifting of the coil 11 in order to achieve the desired response.

In practice it is found that by effecting the desired adjustments when the pointer is at, say, 8 on the scale, which scale will usually be a scale of squares, then the pull of the core will operate through a lever arm very nearly proportional to the deflections at other points of the scale.

If the circuit to which the meter unit A is attached is a three-wire or polyphase circuit, and there is reason to expect voltage variations among the circuits being supplied, the electromagnet may comprise several sections as shown at 12, 13 and 14 in Figure 3, suitably connected with the different phase wires, so that their action is cumulative in respect to the core 8' which will then respond to the average volts supplied.

Referring to the modification shown in Figure 2, the unit A' represents any conventional "demand" type of meter mechanism, such as for measuring volt-amperes or kilovolt-amperes, and may be said to differ from the meter unit A in that there is a time lag in the response of the pointer 4' actuated by the shaft 5', as is well known in the art.

In order therefore to apply the present invention thereto it is desirable to provide a compensating mechanism which will not be instantaneously affected as in the forms shown in Figures 1 and 3, but which will have a time response or delay the same as that of the meter itself.

As an example of a simple means of accomplishing the desired compensation, a pair of bi-metallic strips 15 and 16, mounted in opposition in suitable blocks 17 carried by a rotatable gear wheel 18, may be provided, the free ends of the bi-metallic strips being connected together at 19 and having a flexible connection 9' with the angular extension 7' of the pointer, which connection may be in the form illustrated in Figure 1 to provide a variable radial relation between the connected members.

A tubular housing 20 loosely encloses the bi-metallic strip 15 and this may be made of metal or other substance having a desirable storage value for heat, and heaters 21, 22 and 23 are here shown energized from the respective phases of the power line under measurement and arranged in heat-exchange relation to the housing 20, so that it will be heated in proportion to the average voltage of the different phases. If however no voltage difference exists between the different phases of the system then only a single resistance would suffice.

The resistance units and housing 20 are so co-related to each other and to the bi-metallic member 15 that there will be time lag in the response of the elements 15 and will have the same delay characteristic as the pointer 4', so that when a variation in voltage is encountered the compensating mechanism will not respond immediately but will have the same characteristics of response as the meter mechanism with which it is associated.

Assuming that the indicator 4' is at the 8-position on the scale and that the temperature of the housing 20 is adjusted so as to cause a variation in indication proportional to voltage, then at other points in the scale the pull or push exerted by the pair of bi-metallic strips 15 and 16 will be such as to always compensate for voltage variations. The meter thus becomes a true volt-ampere meter.

The co-operative relation between the bi-metallic members, pointer and housing 20 may be conveniently adjusted by means of a pinion 18' meshing with the adjustable gear wheel 18.

The compensating means will not be affected by changes in ambient temperature, since any influence from this source on the element 15 will be opposed by the element 16 through the connection 19.

While we have shown for purposes of illustration preferred embodiments of the present invention, it will be readily appreciated that the invention is capable of various structural interpretations and modifications without departing from the essential spirit thereof.

What we claim as our invention is:

1. The combination with a volt-ampere meter having a pivotal indicating element and a power circuit connected with said meter, of means connected with the power circuit and responsive to an increase or decrease from normal voltage in said circuit, and means connected with said pointer and actuated by said voltage-responsive means to restrict or increase the rotation of said pointer due to meter actuation to cause said pointer to indicate true volt-amperes in accord with the normal line voltage.

2. The combination with a volt-ampere meter having a pivotal indicating element and a power circuit connected with said meter, of means connected with the power circuit and responsive to an increase or decrease from normal voltage in said circuit, an angular extension from said pointer, and means connected with said angular pointer extension and extending into the zone of influence of said voltage-responsive means and adapted on a decrease of voltage below normal in the power line to pull upon said pointer extension and effect a higher reading than that created by the meter mechanism and to create a retarding influence on the rotary movement of said pointer when the line voltage exceeds normal.

3. A device as claimed in claim 1, in which the means connected with the power circuit and responsive to an increase or decrease from normal voltage in said circuit comprises a solenoid coil, and the means connected with the pointer is a solenoid core operating in said coil.

4. A device as claimed in claim 2, in which the solenoid core is adjustably connected to the extension of the meter pointer element.

5. A device as claimed in claim 2, in which the power circuit is of a multiple phase and the solenoid core is provided with a winding connected with each phase to create an electro-magnetic influence upon the solenoid core proportional to the average voltage of the phases of the circuit.

6. The combination with a volt-ampere meter of the delayed response type having a pivotal indicating element and a polyphase power circuit connected with said meter, resistance means connected with said circuit and having a variable heating effect in accordance with voltage in the line circuit being above or below normal, a heat-absorbing means arranged in heat exchange relation to said resistances, and heat-actuated means arranged within the heat influence of said heat-absorbing means and operatively connected with the pointer extension to retard the movement of the pointer when voltage rises above normal and to assist the movement of the pointer when the line voltage is below normal.

7. A meter as claimed in claim 6, in which the heat-absorbing body is of tubular form and the resistances affected by voltage fluctuation are connected with the line circuit and arranged to impart their heat to said tubular member, a bi-metallic strip extending through said tube, a bi-metallic strip arranged outside of said tube and connected to the aforesaid bi-metallic strip, and means connecting said bi-metallic strips to the extension of the pointer to increase the movement of the pointer upon the line voltage reducing and to retard the movement of the pointer on the line voltage increasing.

PAUL M. LINCOLN.
LOUIS A. PAINE.